United States Patent
Suzuki

(10) Patent No.: US 6,549,947 B1
(45) Date of Patent: Apr. 15, 2003

(54) PRINT SYSTEM AND HOST DEVICE THEREFOR

(75) Inventor: Tetsuya Suzuki, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/456,502

(22) Filed: Dec. 8, 1999

(30) Foreign Application Priority Data

Dec. 10, 1998 (JP) .......................................... 10-351085

(51) Int. Cl.$^7$ .............................................. G06F 15/16
(52) U.S. Cl. ..................................... 709/229; 358/1.15
(58) Field of Search .............................. 710/1, 2, 5, 14, 710/19, 52, 57, 3, 4, 25, 26, 58; 709/229, 250, 221; 358/1.15, 1.13, 1.11; 714/4; 399/18, 77, 79, 82

(56) References Cited

U.S. PATENT DOCUMENTS

| | | | |
|---|---|---|---|
| 5,490,237 A | * 2/1996 | Zimmerman et al. | 358/1.15 |
| 5,706,410 A | 1/1998 | Bagley et al. | |
| 5,764,869 A | 6/1998 | Bagley et al. | |
| 6,130,758 A | * 10/2000 | Funazaki | 358/1.13 |
| 6,259,468 B1 | * 7/2001 | Higuchi | 271/8.1 |
| 6,313,919 B1 | * 11/2001 | Nakagiri et al. | 358/1.11 |
| 6,359,696 B1 | * 3/2002 | Hori et al. | 358/1.13 |

* cited by examiner

Primary Examiner—Mehmet B. Geckil
(74) Attorney, Agent, or Firm—Sughrue Mion, PLLC

(57) ABSTRACT

A printer driver of a host computer checks the size of RAM of a dumb printer. There are prepared print data comprising a bit image, which has resolution and levels of halftone matching the size of the RAM. Print data are divided into data on a per-pagebasis or a per-band basis. While managing the sequence of band data pertaining to individual pages of the print data, a print monitor sequentially sends the band data to the dumb printer. Every time one of the band data sets is transmitted, the print monitor receives, from the dumb printer, data pertaining to the current status of or an error in the dumb printer. The thus-received data are indicated on a display. In accordance with the printer status or an error in the printer, the print monitor controls the dumb printer so as to transmit subsequent band data, suspend transmission of subsequent band data, or re-transmit subsequent band data. The print monitor retains print data pertaining to an individual page until the completion of printing of the page is reported by the dumb printer. If there arises a necessity for print data pertaining to individual pages as a result of occurrence of an error, the print monitor re-transmits the data pertaining to the page.

19 Claims, 13 Drawing Sheets

PRINT SYSTEM AND HOST DEVICE THEREFOR

BACKGROUND OF THE INVENTION

1. Field of the Invention

The present invention relates to a print system and a host device for the print system.

The present application is based on Japanese Patent Application No. Hei. 10-351085, which is incorporated herein by reference.

2. Description of the Related Art

There has already been known a print system comprising a host device, such as a personal computer, and a printer which performs printing operation upon receipt of print data from the host device. Functions and performance required of the print system are growing increasingly sophisticated. In some cases, a printer is equipped with a high-performance CPU, large-capacity memory, and a high-speed/high-performance engine, thus tending to become increasingly large. In other cases, a printer has only the minimum required functions; for example, typically a printer is equipped with only the basic function of performing only printing operation upon receipt of bitmapped image data. There exists a reasonable level of demand for this type of printer (called a dumb printer or host-based printer), because of its low price.

One of the major factors which make the dumb printer attractive to users resides in low price, and another major factor resides in negating the need for laborious operation of a control panel. In contrast, the major drawback of the dumb printer resides in low-grade functionality. In designing a dumb printer, in order to minimize price the manufacturer must inevitably make efforts to use low-level components, completely eliminate a control panel, and embody the greatest-possible print performance and functions.

SUMMARY OF THE INVENTION

An object of the present invention is to provide a high-performance print system employing a dumb printer.

Accordingly, the present invention provides a print system including a printer and a host device which is connected to the printer in a communicable manner and controls the printer. The printer comprises memory used as a receiving buffer; receiving means which receives print data transmitted from the host device and stores the thus-received print data into the receiving buffer; print means which performs print operation on the basis of the print data stored in the receiving buffer; status data means which determines the current status of or an error in the printer, prepares status data representing the thus-determined status or error, and retains the thus-prepared status data; and response means which, in response to an individual command sent from the host device, prepares a reply including the currently-retained status data and sends the reply back to the host device. Further, the host device comprises print data preparation means for preparing the print data; data transmission means which divide the thus-prepared print data pertaining to a single job into a plurality of fractional data sets, prepares a plurality of data transmission commands, each of which includes a corresponding one of the fractional data sets, and sequentially transmits the data transmission command to the printer; status acquisition means which receives a reply transmitted from the printer in response to each of the data transmission commands and acquires the status data included in the thus-received reply; and user interface means which informs the user of the status of or error in the printer, on the basis of the thus-acquired status data.

In the print system, the host device divides print data into a plurality of fractional data sets (for example, band data divided on a per-page basis or a per-band basis). The fractional data sets are transmitted to the printer in the form of data transmission commands. Every time the host device transmits a data transmission command, the host device receives a reply from the printer, thus determining the current status of or an error in the printer. The thus-determined status or error is reported to the user. Hence, the user can ascertain the current status of the printer on a user interface screen of the host device. Further, the host device utilizes the thus-determined status or error in determining whether to continue, suspend, or resume transmission of subsequent data, or in determining whether to delete subsequent data. Accordingly, although the printer per se is inexpensive and has a simple structure, the host device can effect considerably-sophisticated print control.

Preferably, the host device further comprises status request means which sends, to a printer, a status request command for requesting status data when the host device fails to send any data transmission command. By virtue of this status request means, even before transmission of print data or when transmission of print data is suspended for reasons of occurrence of an error, the host device can keep track of the status of the printer, whenever necessary, and determine the next appropriate operation.

Preferably, the printer further comprises means for notifying the host device of the capacity of the memory in response to an inquiry about memory capacity transmitted from the host device. The host device further comprises means which transmits the inquiry about memory capacity to the printer before preparation of the print data pertaining to a single print job and which receives the memory capacity from the printer. The print data preparation means of the host device prepares print data by expanding all the image data into a bit image. At this time, a plurality of transmission modes having different resolutions or levels of halftone are prepared with regard to the bit image. An appropriate transmission mode is selected from the plurality of transmission modes in accordance with the memory capacity reported by the printer. As a result, for example, in a case where the memory is of small capacity, there is prepared a bit image having lower resolution and a lower level of halftone. Thus, there can be prepared print data which can be processed by the printer; i.e., which can be processed within the range of capacity of the memory of the printer. Therefore, even when the capacity of the memory of the printer is small, normal printing can be effected.

Preferably, the fractional data sets correspond to band data into which each page is divided on a per-band basis. The print means of the printer initiates printing operation when the printer has received band data pertaining to a predetermined number of bands smaller than the number of bands corresponding to a single page of the beginning of print data pertaining to a single print job. The print means of the printer initiates printing operation when the receiving buffer becomes full before receipt of the band data pertaining to the predetermined number of bands. Accordingly, the printer can perform normal printing even when the memory of the printer is of small capacity.

Preferably, buffer-full data representing whether or not the receiving buffer is full are included in a reply returned from the printer. When the buffer-full data included in the reply returned from the printer represents that the receiving buffer is full, the data transmission means temporarily suspends transmission of a subsequent data transmission command, the status request means repeatedly sends to the printer the status request command, and, on the basis of a replay returned from the status request command, the host device determines whether or not the receiving buffer has been released from a full state. When the receiving buffer has been released from a full state, the data transmission means resumes transmission of the subsequence data transmission command.

The print data are divided into a single or a plurality of fractional data sets on a per-page basis. Before transmission of the data transmission command pertaining to a certain page, the host device transmits a page start declaration command including designation of the number of copies to be printed. Further, the host device determines whether or not all the data transmission commands pertaining to the page can be stored in the receiving buffer of the printer (that is, whether conventional multi-copy printing of the page would be successful or unsuccessful). The entirety of the data transmission commands pertaining to a page for which the successful/unsuccessful multi-copy printing determination means has determined that multi-copy would be unsuccessful is repeatedly transmitted to the printer, in the number of times corresponding to the number of copies to be printed. With regard to a certain page which the page start declaration has designated to be printed in a plurality of copies, when the entirety of the data transmission commands corresponding to the page can be stored in the receiving buffer, the printer prints the page in the number of copies to be printed, on the basis of the data transmission commands that correspond to the page and are stored in the receiving buffer. As a result, multi-copy printing(i.e., printing of a certain page in a plurality of copies) is enabled even when memory of the printer is of small capacity.

Preferably, when printing of a page has finished, the printer sends a page print completion report to the host device. The host device manages the print data on a per-page basis, and retains the print data pertaining to a page that has already been transmitted to the printer, until a print completion report about the page is received. As a result, in a case where there arises a necessity for re-printing a page from the beginning, even if the memory of the printer is of small capacity and does not retain all the data pertaining to the page, printing of a certain page can be resumed by way of re-transmission of the print data from the host device.

Preferably, the host device has a queue representing the sequence of the pages which have been transmitted to the printer and discards print data pertaining to the head of the queue every time the management means receives the page print completion report. As a result, through use of a simple configuration, the data pertaining to a page which does not need to be retained after printing can be discarded without fail.

Preferably, when the status data included in the reply represent the occurrence of an error, the host device determines the type of error and executes an error processing routine corresponding to the thus-determined type of error.

Preferably, the host device sends the status request to the printer not only during a printing operation but also while in an idle state, whenever necessary, so as to check, by reference to the status data reported by the printer in response to the status request, whether a problem has arisen in the printer. If a problem has arisen, the host device suspends or aborts transmission of the print data.

The host device of the present invention is typically embodied by a computer. A program for use in activating the computer can be installed or loaded on the computer by means of a medium of any of various forms, such as a recording disk, semiconductor memory, or a communication signal.

Features and advantages of the invention will be evident from the following detailed description of the preferred embodiments described in conjunction with the attached drawings.

DETAILED DESCRIPTION OF THE PREFERRED EMBODIMENTS

Figure 1:
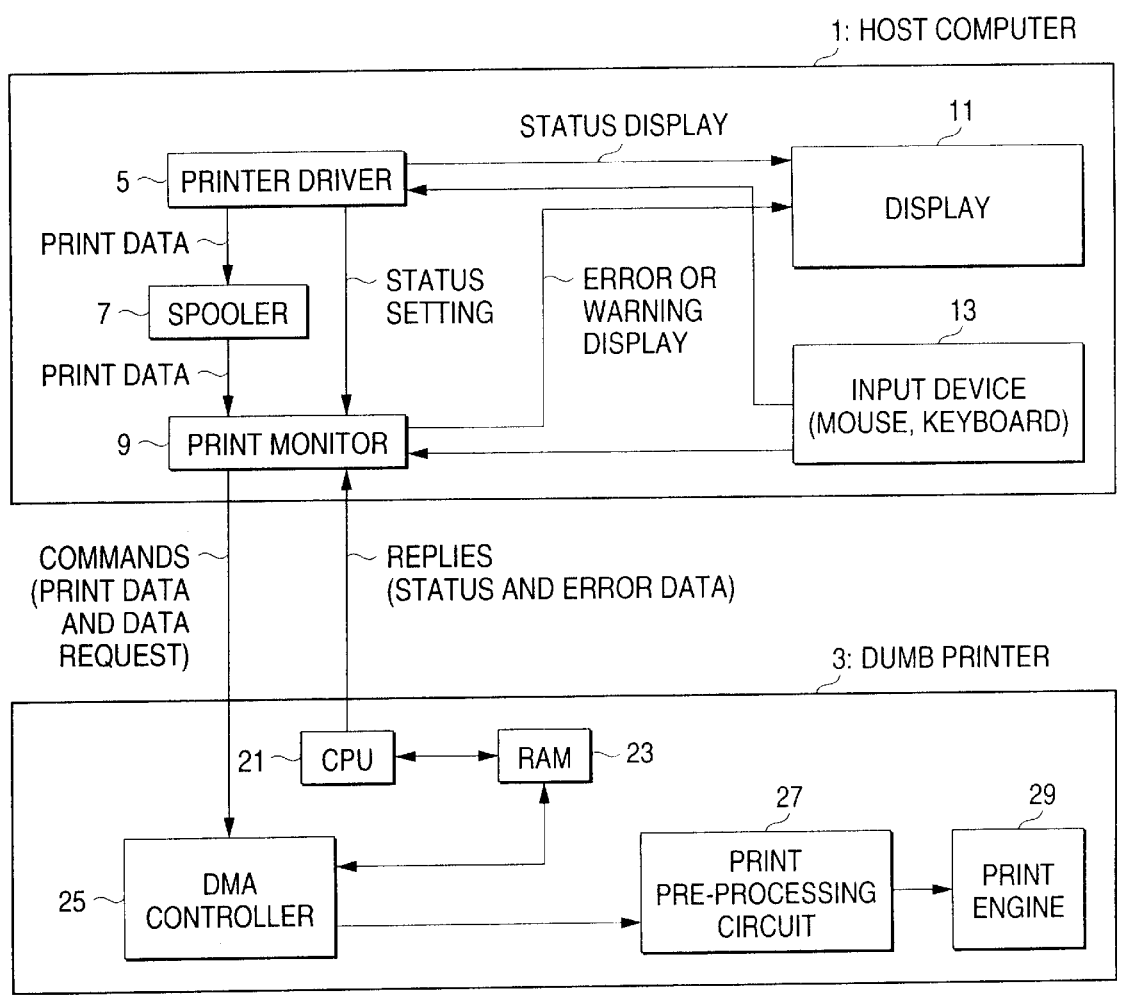
FIG. 1 is a block diagram showing the overall configuration of a print system using a dumb printer according to one embodiment of the present invention.

FIG. 1 shows the overall configuration of a print system using a dumb printer according to one embodiment of the present invention.

A host computer 1 is connected to a dumb printer 3. The host computer 1 comprises a printer driver 5, which serves as a program module for controlling the dumb printer 3, and a printer monitor 9.

The printer driver 5 performs setting/indication of status of the printer 3, generation of bitmapped image data (i.e. a bitmapped image), and generation of print data to be sent to the printer monitor 9. The printer driver 5 indicates, on a display 11 of a host computer 1, a graphic user interface screen to be used for setting/indicating the printer status. The printer driver 5 operates in response to a user instruction entered by way of an input device, such as a mouse or a keyboard. The printer driver 5 passes, to a spooler 7 of the operating system, the thus-produced print data to be sent to the print monitor 9.

The print monitor 9 generates a command from the print data produced by the printer driver 5 in accordance with a protocol assigned to the printer 3, exchanges a command and a response with respect to the printer 3 (including exchange of a printer status with respect to the printer 3), and indicates errors or warnings. The print monitor 9 indicates, on the display 11, a graphic user interface screen to be used for indicating errors/warnings. The print monitor 9 operates in response to a user instruction entered by way of an input device 13, such as a mouse or a keyboard. The print monitor 9 receives, from the spooler 7, the print data produced by the printer driver 3.

The dumb printer 3 corresponds to, for example, a page printer which performs printing operation by means of the electrophotography method. The printer 3 does not have any control panel for indicating information or performing setting operation 8 (it has, at best, an LED lamp which blinks during a printing operation). Instead of the control panel, the printer driver 5 and the print monitor 9 enable indication, on the user interface screen, of data pertaining to the printer 3 or performance of setting operation. Items which can be set by way of the user interface screen indicated by the printer driver 5 correspond to; for example, resetting of a toner counter, resetting of a photosensitive-member life counter, and selection between print suspension in the event of occurrence of a toner-depletion error and disregard of the error. The data appearing on the user interface screen relating to the printer driver 5 primarily pertain to the status of the printer 3. For instance, the printer status comprises the amount of remaining toner, the total number of copies printed, the life of a photosensitive member, the selection of a paper feeder option, the capacity of RAM provided in the printer, a communications mode, a power-saving mode, the amount of remaining paper, and the sizes of the paper loaded on the paper feeder. The data to be indicated on the user interface screen, which appear on the print monitor 9, primarily relate to errors or warnings; for example, reporting of errors/warnings, cancellation of an error, checking for activation/deactivation of the power of the printer in the event of occurrence of a fatal error, and reporting and cancellation of print suspension in the event of occurrence of a toner-depletion error (when print suspension is selected).

Transmission of a command and return of a reply are repeated between the print monitor 9 and the printer 3; specifically, the print monitor 9 sends a command to the printer 3 and the printer 3 sends back a reply to the print monitor 9, in accordance with a predetermined communications protocol. A command is inevitably paired up with a reply. Various types of commands are available; for example, a command for inquiring the status of the printer 3; a command for declaring initiation of a print job, a page, or a band, or a command for transmitting a bit image of a band to the printer 2. A reply can be returned from the printer 3 immediately after the printer 3 has completed receipt of a corresponding command. A reply comprises data pertaining to the status or an error of the printer 3 at a point in time at which the printer 3 becomes able to return the reply.

The printer 3 has the capability of receiving a command sent from the print monitor 9 into a receiving buffer provided within RAM 23; the capability of interpreting the thus-received command; the capability of producing a laser pulse signal whose pulse width is modulated on the basis of a bit image included in the received command after the bit image has been subjected to preliminary processing such as expansion or contour smoothing operation; the capability of printing an image on paper by means of the electrophotography method and through use of the laser pulse signal; the capability of checking the status of or an error in the printer 3; and the capability of returning data, such as the checked status or error to the print monitor 9, while the data are included in a reply corresponding to the command. Of these capabilities, the capabilities primarily performed by a CPU 21 provided in the printer 3 correspond to the interpretation of a command, checking of the status of or an error in the printer, and generation and return of a reply corresponding to the command. A print pre-processing circuit 27, which is dedicated hardware, subjects the bit image to preliminary processing and generates a laser pulse signal. A print engine 29, which is a dedicated mechanism, prints an image on paper. Further, a DMA controller 25, which is dedicated hardware, transfers to the print pre-processing circuit 27 the bit image stored in the receiving buffer.

The printer 3 has no capability of generating a bit image from print data described in a host device language. As mentioned previously, the printer driver 5, rather than the printer 3, expands a bit image. The RAM 23, which is used by the printer 3 as a receiving buffer or a work area, has comparatively small capacity. Storage of an entire bit image corresponding to one page in the receiving buffer is not guaranteed. Even in such a case, the print monitor 9 controls transmission of a bit image, in accordance with a printer status, in order to effect a correct printing operation. The printer 9 has a flying start capability of starting printing of a page at a point in time when a predetermined amount of data (for example, the amount of data corresponding to several bands) is stored before the image data corresponding to one full page are stored in the receiving buffer. By virtue of combination of these features, the capability of the CPU 21 provided within the printer 3 can be stripped down, and RAM 23 of small capacity is sufficient. Accordingly, the printer 3 can be rendered inexpensive.

Commands such as those provided below are transmitted to the printer 3 from the print monitor 9.

(1) Job Initiation Declaration

This command designates the printer 3 to set the resolution of a bit image (for example, 300 or 600 dpi) on a per-job basis; the level of halftone of a bit image (for example, 2 or 3 bits); activation or deactivation of contour smoothing operation; activation or deactivation of toner saving; and the type of paper. A reply sent from the printer 3 in response to the command includes data pertaining to the status of or an error in the printer at that particular moment.

(2) Job Termination Declaration

This command declares termination of one print job. The job initiation declaration always pairs up with a job termination declaration. A reply transmitted from the printer 3 in response to this command includes data pertaining to the status of or an error in the printer.

(3) Page Start Declaration

This command declares the start of one page and designates, with respect to the printer 3 and on a per-page basis, paper sizes, the number of lines and width of a single band, margins, the effective number of lines, an effective print width, the total number of bands, and the number of copies to be produced through multi-copy printing. A reply sent from the printer 3 in response to this command includes the status of or an error in the printer at that particular moment.

(4) Page End Declaration

This command declares the end of a single page. The page end declaration is always paired up with the page start declaration. This pair is interposed between the job initiation declaration and the job termination declaration. A reply sent from the printer 3 in response to this command includes the status of or an error in the printer at that particular moment.

(5) Band Transmission Declaration

In accordance with this command, data constituting a single band (e.g., designation of compression/non-compression, designation of size of data, and a bit image per se) are transmitted to the printer 3. The band transmission declaration is interposed between the pair comprising the page start declaration and the page end declaration. The printer 3 receives the band transmission declaration only when the capacity of the receiving buffer provided in the RAM 23 is in excess of the data size designated by the band transmission declaration. A reply sent from the printer 3 in response to this command includes the status of or an error in the printer at that particular moment.

(6) Configuration Data Request

In accordance with this command, the printer 3 is requested to send data pertaining to the configuration of the printer 3 (i.e., fixed data which are not changed during the time power is supplied to the printer 3 and which pertain to the total capacity of the receiving buffer, the loaded state of the paper feeder, and like data). The printer 3 can receive this command at any time. A reply sent from the printer 3 in response to this command includes the status of or an error in the printer at that particular moment.

(7) Setting Data Request

In accordance with this command, the printer 3 is requested to send data pertaining to the settings of the printer 3 (e.g., a communications mode established during the immediately previous communication, the current power-saving mode, the sizes of the paper loaded on the paper feeder, and like data). The printer 3 can receive this command at any time. A reply sent from the printer 3 in response to this command includes the status of or an error in the printer at that particular moment.

(8) Status Request

In accordance with this command, the printer 3 is requested to send data pertaining to the status of or an error in the printer 3. The printer 3 can receive this command at any time. A reply sent from the printer 3 in response to this command includes the status of or an error in the printer at that particular moment. For example, as mentioned above, the printer status comprises the amount of remaining toner, the total number of copies printed, the life of a photosensitive member, selection of a paper feeder option, the capacity of the RAM provided in the printer, a communications mode, a power-saving mode, the amount of remaining paper, and the sizes of the paper loaded on the paper feeder.

In addition to the previously-mentioned commands, there exist other commands to be used for setting various statuses of the printer 3; for example, resetting of a toner counter, setting of a value of the toner counter, resetting of a photosensitive member life counter, setting of a value of the photosensitive member life counter, setting of a power-saving mode, and printer initialization.

Figure 2:
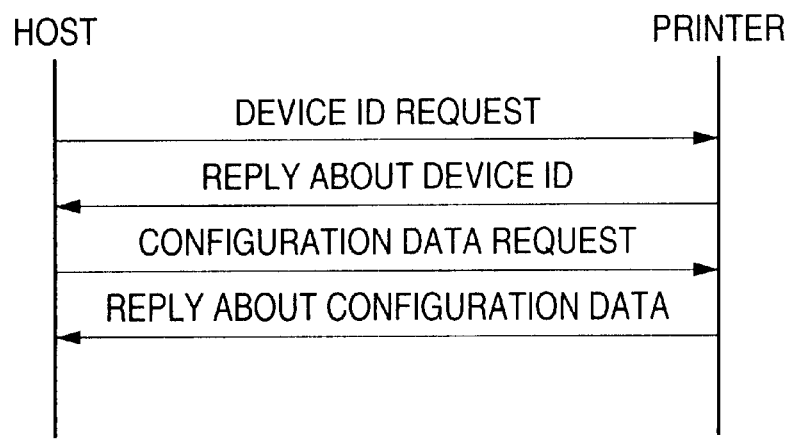
FIG. 2 is a diagram showing procedures for establishing communication between a print monitor 9 (i.e., a host computer 1) and a dumb printer 3 at the time of activation of a printer driver 5.

FIG. 2 shows procedures for establishing communication between the print monitor 9 (or the host computer 1) and the dumb printer 3 when the print system is activated. The print monitor 9 acquires a device ID from the printer 3 and checks whether or not the device ID corresponds to the protocol. Next, the print monitor 9 sends a configuration data request to the printer 3, receives a reply from the same, and checks the capacity of the receiving buffer and for the presence or absence of a paper feeder.

Figure 3:
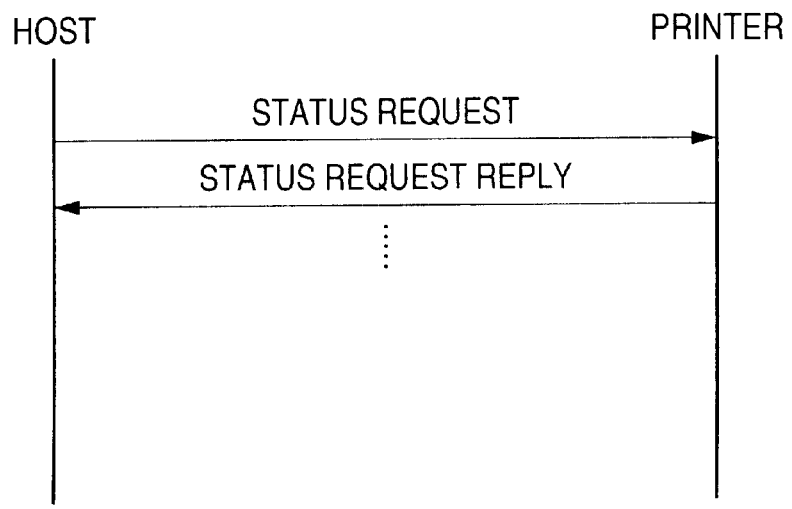
FIG. 3 is a diagram showing procedures for establishing communication between the print monitor 9 (i.e., the host computer 1) and the dumb printer 3 when the print system is in an idle state.

FIG. 3 shows procedures for establishing communication between the print monitor 9 (or the host computer 1) and the dumb printer 3 when the print system is in a non-print mode or an idle state. Even when the print system is in an idle state, the print monitor 9 sends a status request to the printer 3 and receives from the same a reply responding to the request, whenever necessary or at regular time intervals, thus monitoring the status of the printer 3. Even when the print system is in an idle state, an error or warning message can be sent to the user in the event an error or problem exists in the printer (e.g., depletion of paper, depletion of toner, opening of a cover, or a like problem), or print operation can be stopped in spite of a print instruction being entered by the user.

Figure 4:
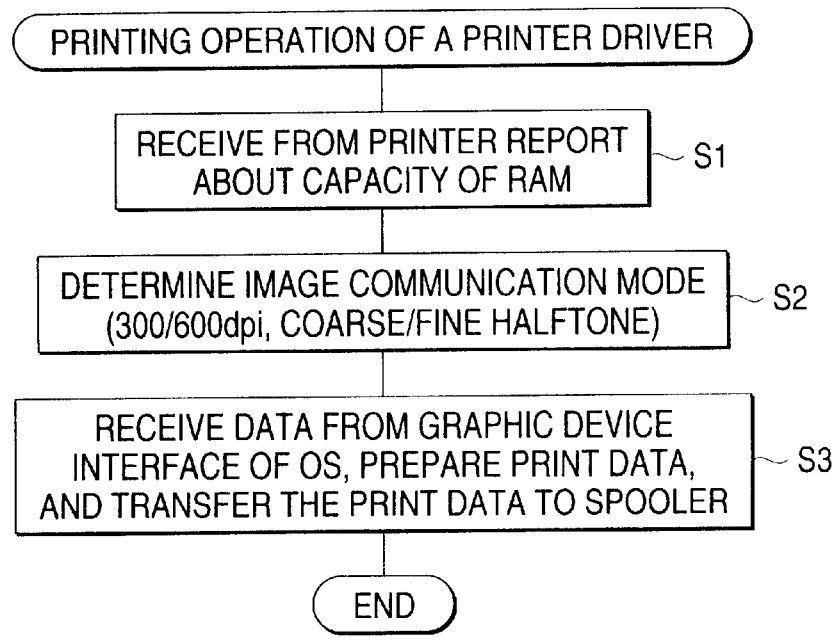
FIG. 4 is a flowchart showing the operation of the printer driver 5 at the time of a printing operation.
Figure 5:
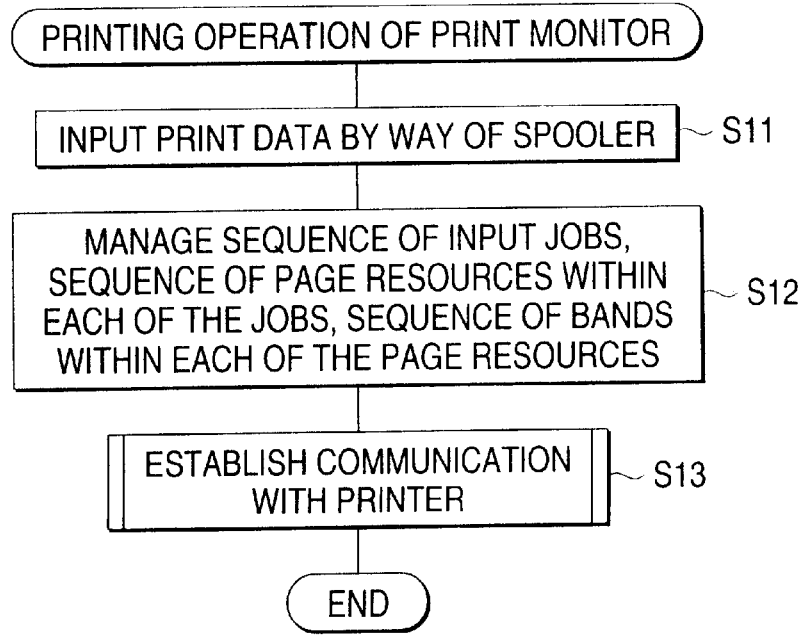
FIG. 5 is a flowchart showing the operation of the print monitor 9 at the time of a printing operation.

FIG. 4 shows the operation of the printer driver 5 at the time of a print operation, and FIG. 5 shows the operation of the print monitor 9 at the time of a print operation.

As shown in FIG. 4, by way of the print monitor 9, the printer driver 5 acquires data pertaining to the status of the printer 3, thus determining the capability of the RAM 23 of the printer 3 (SI). Next, on the basis of the thus-determined capability of the RAM 23, there is determined a transmission mode in which a bit image is transmitted (S2). Here, the transmission mode represents the resolution of a bit image (e.g., 300/600 dpi) and the level of halftone of the bit image (e.g., fine or coarse halftone). For example, the transmission modes include a plurality of combinations; a first mode (300 dpi, coarse halftone), a second mode (300 dpi, fine halftone), a third mode (600 dpi, coarse halftone), and a fourth mode (600 dpi, fine halftone). For instance, in a case where the RAM has a capacity of 2MB, from the first to third modes the mode that most closely corresponds to the user's request is requested. In a case where the RAM has a capacity of 4MB, from the first through fourth modes the mode that most closely corresponds to the user's request is selected. From those modes which can be implemented by the RAM of given capability, the mode that most closely corresponds to the user's selection is determined.

Next, the printer driver 5 receives from a graphic device interface of the operating system data pertaining to a print job. The data are converted into print data whose data format is compatible with that required by the print monitor 9, and the resultant print data are transferred to a spooler 7 (S3). Print data pertaining to a single print job are divided into page resource data on a per-page basis. Each of the page resource data sets is further divided on a per-band basis into band data. The print data transferred to the spooler 7 are input to the print monitor 9 from the spooler 7.

As shown in FIG. 5, the print monitor 9 receives the print data, which are divided on a per-job basis, a per-page basis, and a per-band basis (S11). The print data are placed in a queue, whereby the sequence of input print jobs, the sequence of page resources in the job, and the sequence of bands within the page resource are clearly managed (S12). These sequential orders are utilized at the time of deletion of the page resource data after completion of printing of a page, re-transmission of the page resource data or band data in the event of an error, or deletion of data when a print job is canceled. Subsequently, the print monitor 9 converts the print data, which have been managed, into data that comply with a communications protocol assigned to the printer 3, and establishes communication with the printer 3 for transmitting the print data to the printer 3 (S13).

Figure 6:
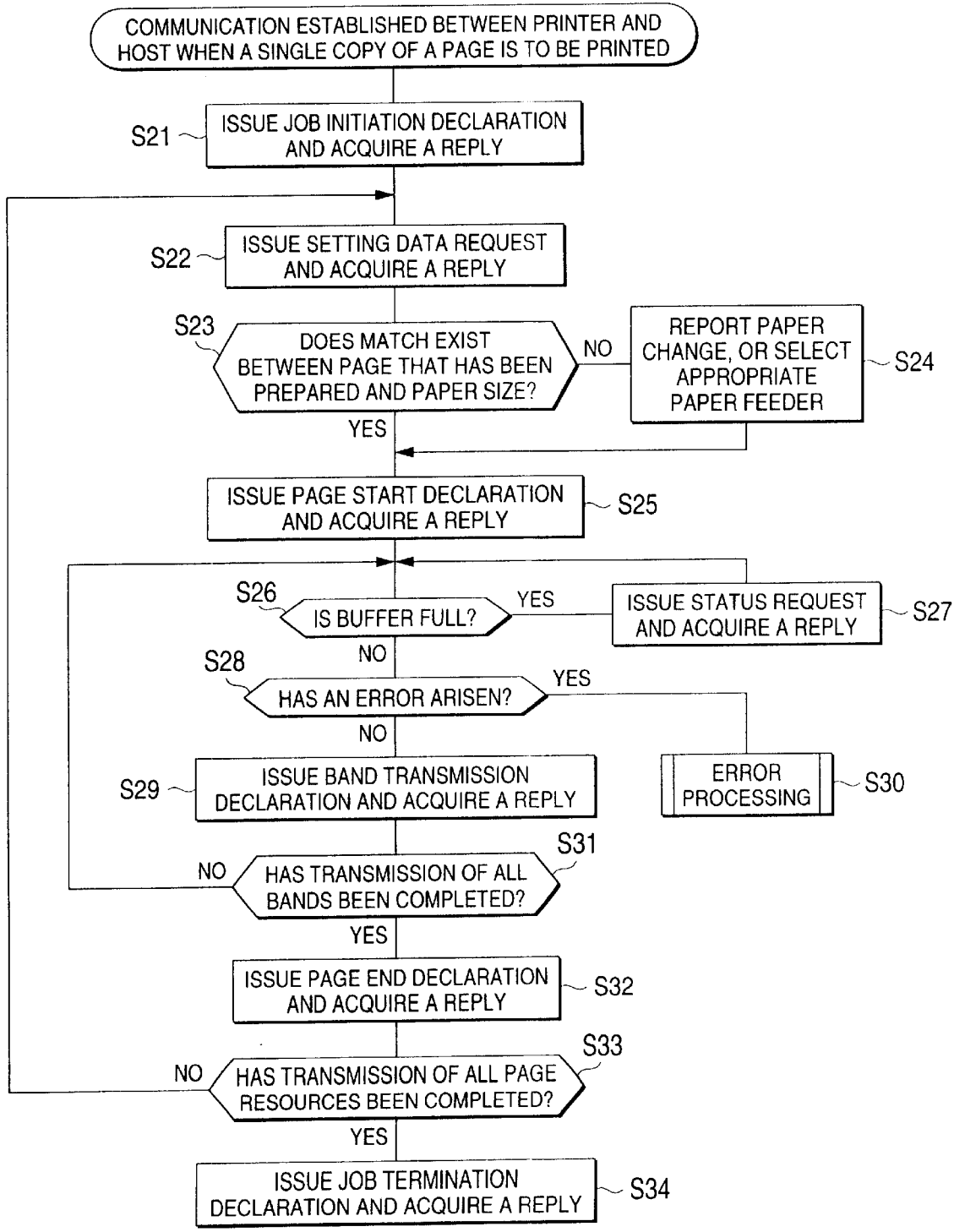
FIG. 6 is a flowchart showing procedures for communication between the print monitor 9 and the printer 3 in step S13 shown in FIG. 5 in a case where a single copy of a page is printed (i.e., one copy of a page is printed)
Figure 7:
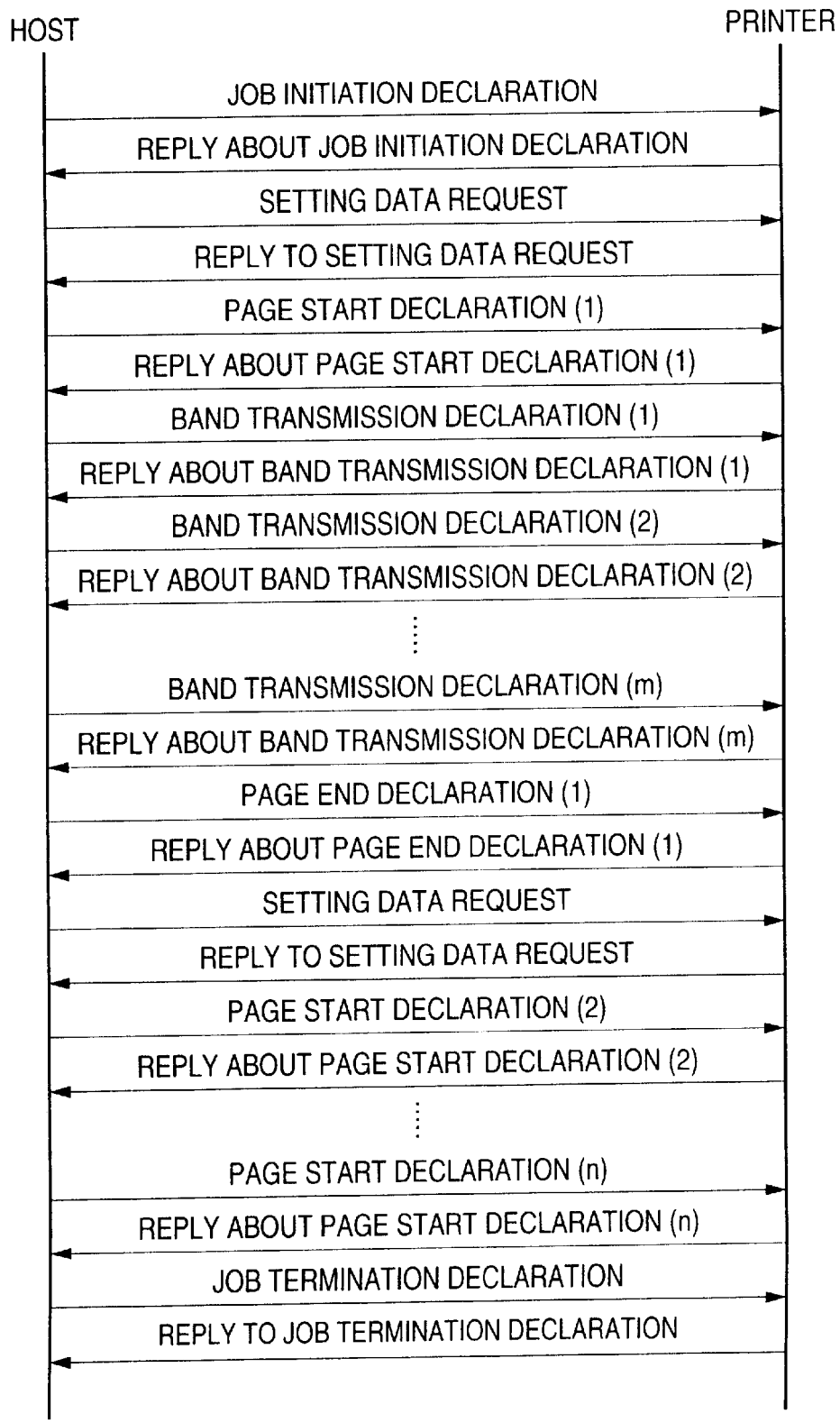
FIG. 7 is a diagram showing procedures for communication between the print monitor 9 (i.e., the host computer 1) and the printer 3 when one copy of a page is printed normally.
Figure 8:
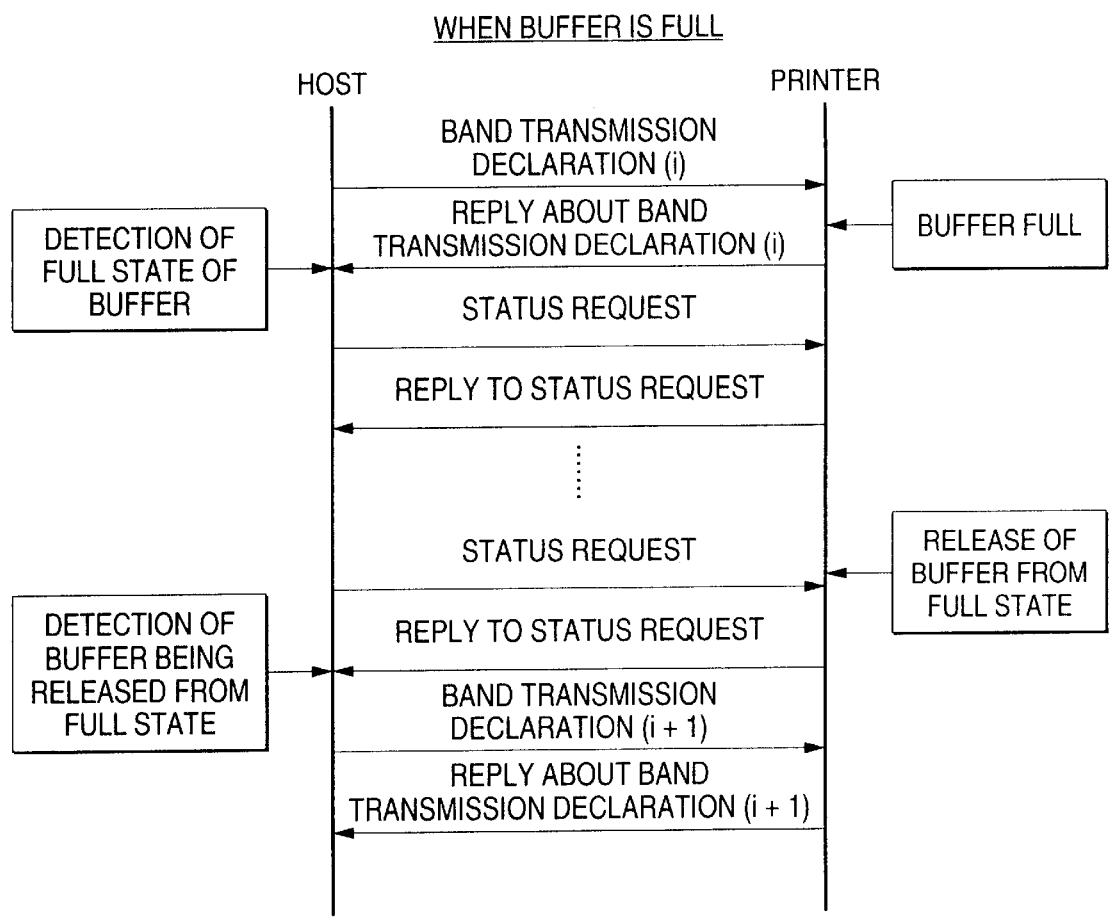
FIG. 8 is a diagram showing procedures for communication between the print monitor 9 (i.e., the host computer 1) and the printer 3 when the full state of a receiving buffer is detected.

FIG. 6 shows the communication established between the print monitor 9 and the printer 3 in step S13 shown in FIG. 5 in a case where a single page (i.e., a single copy) is printed. FIG. 7 shows procedures for communication between the print monitor 9 (i.e. the host computer 1) and the printer 3 effected when printing operation is performed normally in this case. FIG. 8 shows procedures for communication between the print monitor 9 (i.e., the host computer 1) and the printer 3 effected when the full status of the receiving buffer is detected.

As shown in FIGS. 6 and 7, the print monitor 9 sends a job initiation declaration to the printer 3 and receives from the same a reply responding to the declaration (S21). Subsequently, the print monitor 9 sends a setting data request to the printer 3 and receives from the same a reply responding to the request, thus determining the sizes of the paper loaded on the paper feeder of the printer 3 (S22). A check is made as to whether or not a match exists between the size of a page which is to be transmitted now and the paper sizes which have been determined. If no match exists between the size of the page and the sizes of paper, by way of the user interface the user is requested to change paper or select an optimal paper feeder (S24).

In contrast, if a match exists, the print monitor 9 sends a page start declaration to the printer 3 and receives from the same a reply responding to the declaration (S25). Next, the print monitor 9 sends to the printer 3 a band transmission declaration pertaining to the first band within the page and receives from the same a reply responding to the declaration (S29).

Upon receipt of the band transmission declaration, the printer 3 compares the size of the band included in the declaration (i.e., the size of band data which are to be transmitted now) with the memory available in the receiving buffer. If the available memory is smaller than the band data, the printer 3 sends back, to the printer monitor 9, a reply including a printer status which represents that the receiving buffer is full. On the basis of the reply, the print monitor 9 determines whether or not the buffer is full (S26). If the buffer is full, the status request is sent to the printer 3 at regular time intervals and the print monitor 9 receives from the same replies responding to the requests (S27), thus determining whether or not the receiving buffer is released from a full state (i.e., the available memory of the receiving buffer becomes greater than the size of next band data which are to be transmitted now) (S26) (see FIG. 8).

If the buffer is not full, the print monitor 9 sends the next band transmission declaration to the printer 3, thus checking whether or not the buffer is full (S26). These sending and receiving operations are repeated until the final band data within the page resource are transmitted (S31). After transmission of all the band data pertaining to a single page resource is completed in this way, the print monitor 9 sends a page end declaration to the printer 3 and receives from the same a reply responding to the declaration (S32). Operations relating to steps S22 to S32 are repeated until the final page resource of the job is transmitted (S33). After transmission of all the page resource data sets is completed, the print monitor 9 sends a job termination declaration to the printer 3 and receives from the same a reply responding to the declaration (S34). Transmission of a single print job is now completed.

In the foregoing processes, the printer 3 asynchronously performs receipt of commands and printing of a bit image in parallel with each other. So long as the receiving buffer has available memory corresponding to the size of band data, the print monitor 9 may transmit pages (or jobs) one after another without awaiting completion of printing of the previously-transmitted page (or job).

If a predetermined amount of data is received after initiation of receipt of the data pertaining to a single job (for example, when a predetermined number of data sets are received or when the receiving buffer becomes full without a predetermined number of bands being fulfilled), the printer 3 initiates printing by activation of the print engine at that point in time. As a result, the printer 3 can perform printing operation normally even when the receiving buffer is of small capacity. Further, when printing of each of the pages is completed, the printer 3 sends a print completion report to the print monitor 9 (for example, while the report is included in a reply responding to the command). The print completion report is sent continuously until it is received by the print monitor 9. So long as the printer 3 is equipped with a counter which is incremented when printing is completed and decremented when a report is completed, a failure to receive the print completion report is prevented.

Even after completion of transmission of all the data sets constituting a certain page, the data pertaining to the page are retained until the print monitor 9 receives a print completion report pertaining to the page. The printer 3 prints pages in the sequence in which the pages are transmitted, data pertaining to the page placed in the head of the queue are discarded when completion of printing of the page is acknowledged. Accordingly, only the data pertaining to a page which has finished being printed are discarded.

The timing at which the printer 3 activates the print engine can be determined by exclusively the printer 3. However, the printer driver 5 or the print monitor 9 of the host computer 1 may determine an engine activation timing for each page resource, on the basis of a communications mode, the resolution, the amount of data, and the level of halftone. In a case where the engine start timing is determined by exclusively the printer 3, the printer 3 tends to be designed so as to set the engine start timing to the safest numerical value (i.e., the latest timing), so as to prevent an under-run error (i.e., wherein the amount of print data required by the print engine has not yet been received). In this case, however, the engine start timing may be delayed more than required, thus deteriorating the performance of the printer. Further, there is a necessity for experimentally determining a numerical value for each model of printer. The performance of the printer 3 can be optimized if the host computer 1 can determine the earliest engine start timing which would not involve occurrence of an under-run error, on the basis of the communication mode of the host computer 1, the resolution of a page resource, the amount of data, and the level of halftone and can instruct the thus-determined engine start timing to the printer 3. To this end, there may be employed a method comprising the steps of roughly determining a start timing on the basis of the communications mode of the host computer 1, the resolution of a page resource, and the level of halftone; determining the engine start timing as the number of bands for each page resource in consideration of the volume of data pertaining to the entire page; and transmitting the thus-determined number of bands to the printer 3. One example set of specific procedures of the method is provided below, the steps thereof being designated by (1) to (3).

(1) On the basis of the resolution of each page resource (e.g., 300/600 dpi), the level of halftone (e.g., fine/coarse), and the communications mode of the host computer 1 (e.g., COMPATIBILITY/ECP), a start timing coefficient of each page is determined, as provided in, e.g., Table 1.

TABLE 1

| Resolution (DPI) | Communications Mode | Level of halftone | Start Timing Coefficient |
| --- | --- | --- | --- |
| 300 | COMPATIBILITY | COARSE | 0.50 |
| 300 | COMPATIBILITY | FINE | 0.55 |
| 300 | ECP | COARSE | 0.35 |
| 300 | ECP | FINE | 0.45 |
| 600 | COMPATIBILITY | COARSE | 0.50 |
| 600 | COMPATIBILITY | FINE | 0.70 |
| 600 | ECP | COARSE | 0.45 |
| 600 | ECP | FINE | 0.65 |

(2) The printer driver 5 or the print monitor 9 multiplies the size of data pertaining to each page by a start timing coefficient, thus determining the size of data to be received in correspondence to the engine start timing of each page.

(3) The printer driver 5 or the print monitor 9 divides the size of data to be received by a band size for each page, thus determining the number of bands to be received at the engine start timing of each page. The number of bands to be received is included in a page start declaration, and the page start declaration is sent to the printer 3.

The only requirement imposed on the printer 3 is that the print engine be activated at a point in time when there are received band data whose number of data sets are equal to the number of bands to be received as reported by the printer driver 5 or the print monitor 9. Consequently, an optimal start timing is determined, thus enabling both prevention of an under-run error and high performance.

Figure 9:
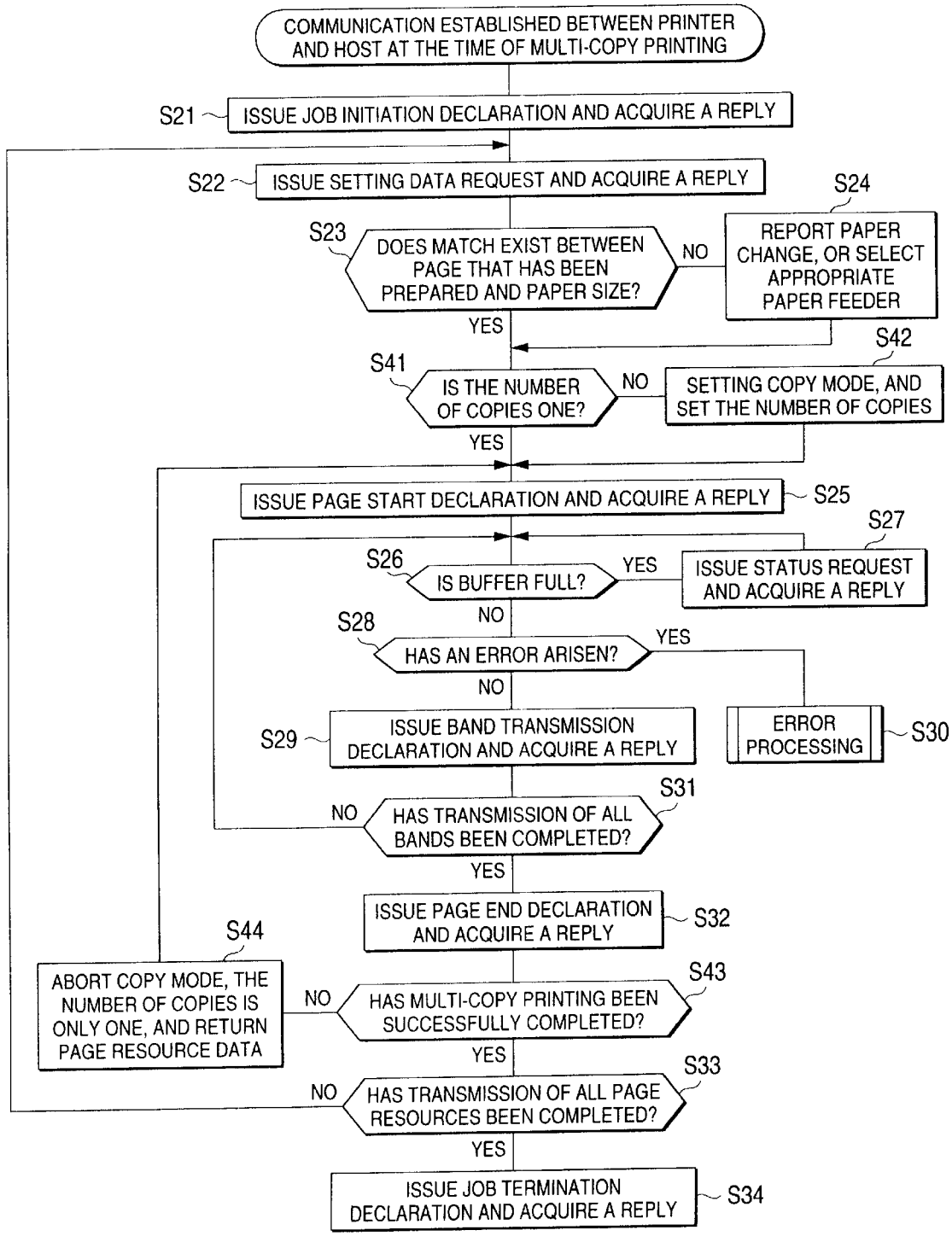
FIG. 9 is a diagram showing procedures for communication between the print monitor 9 and the printer 3 in step S13 shown in FIG. 5 in a case where a page is printed in a plurality of copies (i.e., a plurality of copies of a page are printed)
Figure 10:
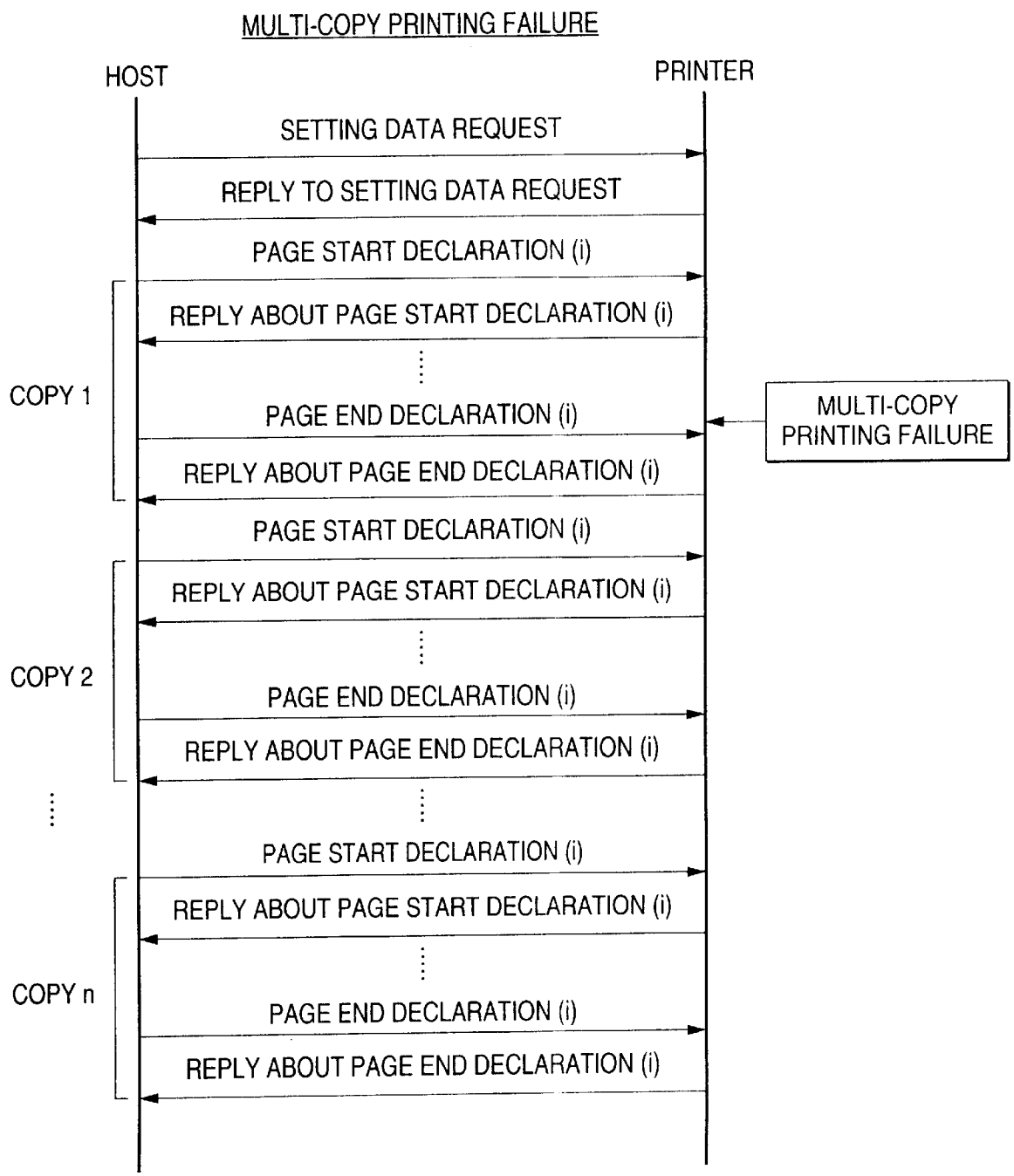
FIG. 10 is a diagram showing procedures for communication between the print monitor 9 (i.e., the host computer 1) and the printer 3 when multi-copy printing of a page is failed.

FIG. 9 shows procedures for establishing communication between the print monitor 9 and the printer 3 in step S13 shown in FIG. 5 in the case of multi-copy printing (wherein a plurality of copies are to be printed). FIG. 10 shows procedures for establishing communication between the print monitor 9 (i.e., the host computer 1) and the printer 3 when multi-copy printing has failed. Most of the steps shown in FIG. 9 are identical with those shown in FIG. 6, and hence the same reference numerals are assigned to such steps. Repetition of their explanations is omitted here for brevity.

As shown in FIG. 9, before issuing a page start declaration (S25), the print monitor 9 checks the number of copies of a page (i.e., the number of prints to be produced) (S41). If a plurality of copies of a page are to be printed, the multi-copy mode is set to ON within the page start declaration, and the number of copies is set (S42). The page start declaration is then transmitted to the printer 3 (S25).

When transmitting a page end declaration with regard to each page to the printer 3 and receiving from the same a reply responding to the declaration (S32), the print monitor 9 determines whether the multi-copy printing has ended successfully or unsuccessfully (S43). Here, successful multi-copy printing means that all the resource data pertaining to a single page can be stored in the receiving buffer of the printer 3 (i.e., the total capacity of the receiving buffer is greater than the size of the page resource data). In contrast, unsuccessful multi-copy printing means that only a portion of the page resource data pertaining to a single page can be stored in the receiving buffer of the printer 3 (i.e., the total capacity of the receiving buffer is smaller than the size of the page resource data). In the case of successful multi-copy printing, multi-copy printing is performed, in the number of times corresponding to the number of copies to be produced, through use of the page resource stored in the receiving buffer of the printer 3. The print monitor 9 then transmits the next page resource.

In contrast, in the case of unsuccessful multi-copy printing, the printer 3 cannot effect multi-copy printing. Hence, the print monitor 9 must send to the printer the page resource of a single page, in the number of times corresponding to the number of copies to be produced. Accordingly, the print monitor 9 repeatedly performs issuance of a page start declaration—in which the multi-copy mode is turned off—and re-transmission of the page resource of a single page to the printer 3, in the number of times corresponding to "the number of copies to be produced" minus 1 (because the page resource for the first copy has already been transmitted) (S44). As a result, multi-copy printing can be implemented even when the RAM of the printer 3 is of small capacity.

In the flow of communication processing shown in FIGS. 6 and 9, the print monitor 9 checks for occurrence of an error on the basis of a reply, every time the print monitor 9 sends a command, such as a band transmission declaration, to the printer 3 and receives from the same a reply responding to the command (S28). In the event of occurrence of an error, the print monitor 9 performs processing corresponding to the type of the error (S30). Errors can be roughly classified into three categories:

(1) Printer Errors

Printer errors include the opening of a printer cover, depletion of paper, depletion of toner, and a like error. The printer 3 may not perform printing until such an error is eliminated. However, the printer 3 can receive band data until the receiving buffer becomes full. Printing of a band subsequent to the band that has been printed can be initiated after elimination of the error. Upon detection of this type of error, the print monitor 9 informs the user of occurrence of the error, by way of a user interface screen.

(2) Print Result Errors

Print result errors include paper jams, an under-run error (i.e., receipt of data required by the print engine has not yet been completed because of a delay in the processing of the host computer 1), and like errors. The printer 3 cannot perform printing operation until such an error is eliminated. After elimination of the error, the printer 3 must again print the same page from the beginning. Upon detection of occurrence of such an error, the print monitor 9 informs the user of occurrence of the error, by way of the user interface screen. After elimination of the error, the data, which remain undeleted and still exist in the host computer 1, are re-transmitted in chronological order from the oldest data. However, at the time of multi-copy printing, the printer 3 does not discard the data stored in the receiving buffer, and prints the data again.

(3) Fatal Errors

Fatal errors include a data expansion error, a video transport error, a print engine error, a communications protocol error, and like errors. The printer 3 cannot return to a state where it can properly process a command, until the power of the printer 3 is again turned on. After having returned to a state where the printer can perform operation properly, as a result of the power of the printer 3 being turned on again, the printer 3 must print the same page from the beginning. Upon detection of occurrence of such an error, the print monitor 9 prompts the user to again turn on the power of the printer 3, by way of the user interface screen, and suspends transmission of data until elimination of the error is acknowledged after the power of the printer 3 has been turned on again. When an acknowledgement button is pressed, the print monitor 9 re-transmits the data, which remain undeleted within the host computer 1, in chronological order from the oldest data. If a fatal error again arises after re-transmission of the data, the print monitor 9 informs the user of a service call error, by way of the user interface screen.

Figure 11:
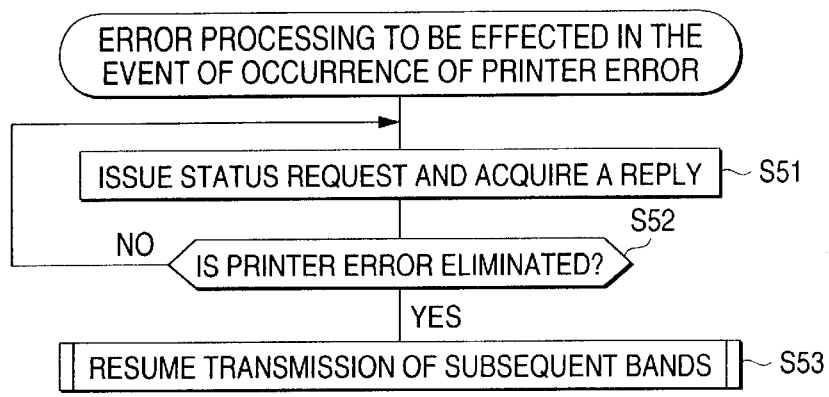
FIG. 11 is a flowchart showing error processing to be performed by the print monitor 9 in the event of occurrence of a printer error.
Figure 12:
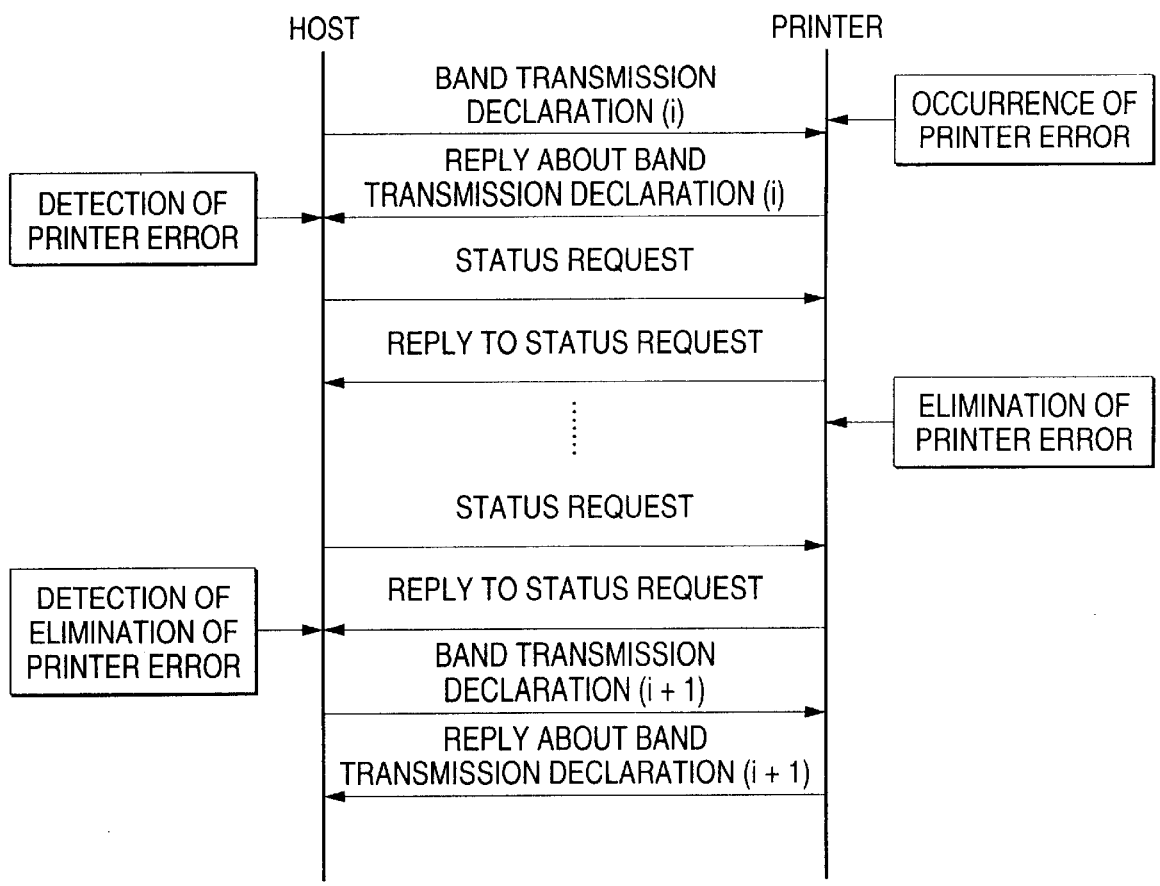
FIG. 12 is a diagram showing procedures for communication between the print monitor 9 (i.e., the host computer 1) and the printer 3 in the event of occurrence of a printer error.

FIG. 11 shows the flow of error processing to be performed by the print monitor 9 in the event of occurrence of a printer error. FIG. 12 shows procedures for the communication between the print monitor 9 (i.e., the host computer 1) and the printer 3 in the event of occurrence of a printer error.

Upon detection of a printer error on the basis of a reply transmitted from the printer 3, the print monitor 9 thereafter transmits a status request to the printer 3 at regular time intervals and receives a reply responding to the request (S51). On the basis of the thus-received reply, the print monitor 9 checks whether or not the printer error has been eliminated (S52). After elimination of the error, processing proceeds to step S29 shown in FIGS. 6 and 9, where transmission of subsequent bands, which have not yet been transmitted, is resumed (S53).

Even in the event of occurrence of a printer error, the printer 3 can receive band data until the receiving buffer becomes full. Therefore, a step of continuously transmitting subsequent band data until the receiving buffer becomes full may be placed before step S51 shown in FIG. 11. In this case, processing proceeds to step S51 when the receiving buffer becomes full. If the printer error is eliminated before the receiving buffer becomes full, processing proceeds to step S29 shown in FIGS. 6 and 9 without proceeding to steps S51 and S52, as if nothing had happened. Thus, printing processing is effected continuously.

Figure 13:
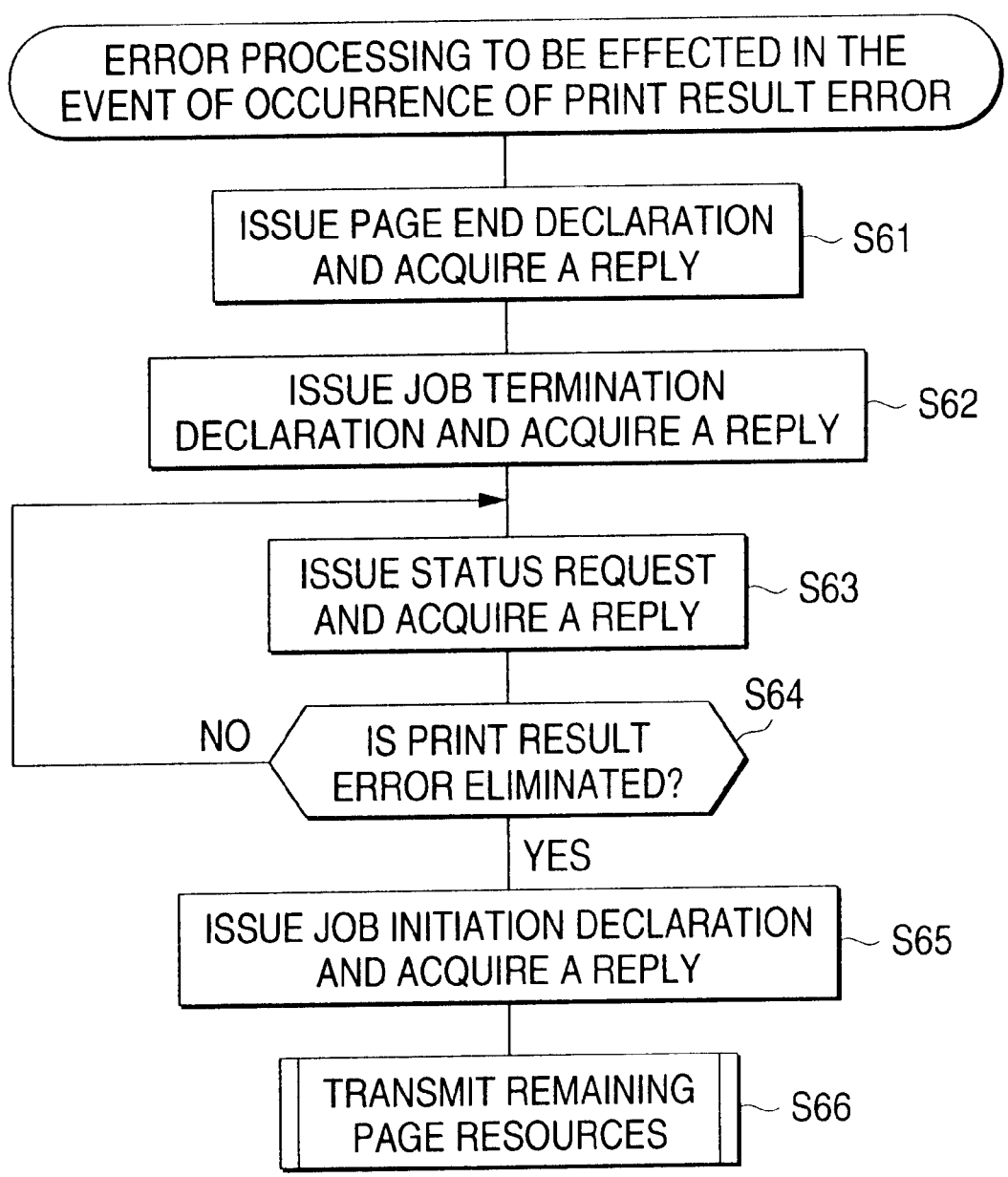
FIG. 13 is a flowchart showing error processing to be performed by the print monitor 9 in the event of occurrence of a print result error.
Figure 14:
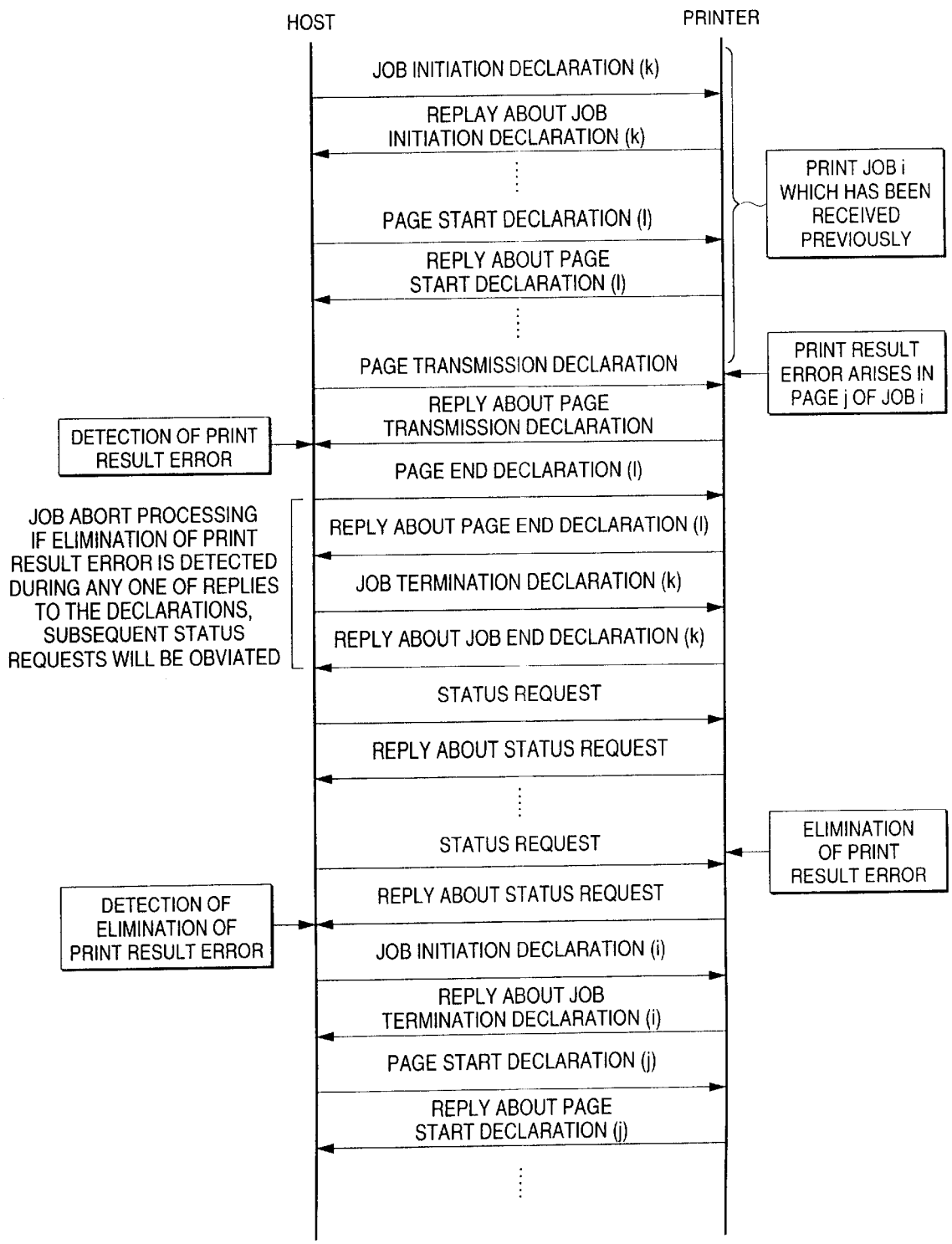
FIG. 14 is a diagram showing procedures for communication between the print monitor 9 (i.e., the host computer 1) and the printer 3 in the event of occurrence of a print result error.

FIG. 13 shows the flow of error processing to be performed by the print monitor 9 in the event of occurrence of a print result error. FIG. 14 shows procedures for the communication between the print monitor 9 (i.e., the host computer 1) and the printer 3 effected in the event of occurrence of a print result error.

Upon detection of occurrence of a print result error on the basis of a reply returned from the printer 3, the print monitor 9 transmits a page end declaration (S61) and transmits a job termination declaration (S62), thus suspending the current print job. Subsequently, the print monitor 9 transmits a status request at regular time intervals (S63) and checks, on the basis of a reply responding to the request from the printer 3, whether or not the print result error has been eliminated (S64). If the print result error has been eliminated, the job initiation declaration is transmitted again (S65), and re-transmission of the print data stored in the host computer 1 is initiated in chronological order from the oldest page resource still remaining in the host computer 1 (i.e., from the page resource which was being printed when the error arose) (S66). Although not shown in the drawings, if elimination of an error is detected on the basis of a reply responding to the page end declaration issued on step S61 or a reply responding to the job termination declaration issued in step S62, processing immediately proceeds to step S65 by way of skipping steps S63 and S64.

If a print result error arises during printing of the page that has been subjected to successful multi-copy printing, the data pertaining to the page remain intact in the receiving buffer of the printer 3. Therefore, after elimination of the print result error, the printer 3 fulfills multi-copy printing of the page, and in step S66 the print monitor 9 resumes transmission the next page resource.

In the event of occurrence of an under-run error among the print result errors, the error is due to overload imposed on the host computer 1. Therefore, even if transmission of the data is resumed, there still remains a great probability of occurrence of an under-run error. Therefore, the print monitor 9 discards all the data pertaining to a job of interest without re-transmission of the page. Further, the print monitor 9 may order the printer driver 5 to again prepare print data of the same job from the beginning (or print data of the pages which have not yet been printed) in a transmission mode which imposes a smaller burden on the computer 1; i.e., a transmission mode of lower grade (e.g., the resolution is reduced from 600 dpi to 300 dpi or the level of halftone is reduced from 3 bits to 2 bits), and may re-transmit the thus-prepared print data to the printer 3.

Figure 15:
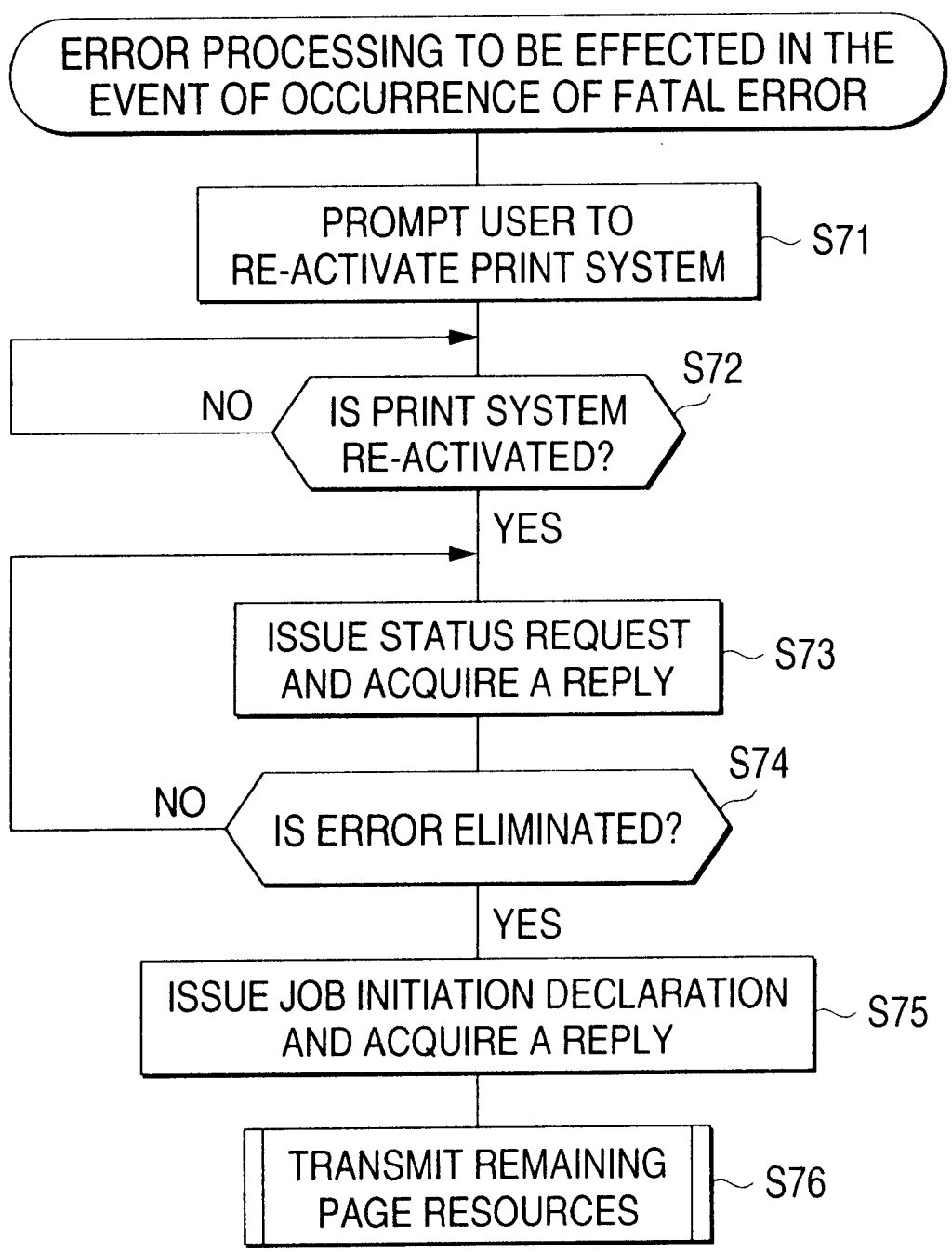
FIG. 15 is a flowchart showing error processing to be performed by the print monitor 9 in the event of occurrence of a fatal error.
Figure 16:
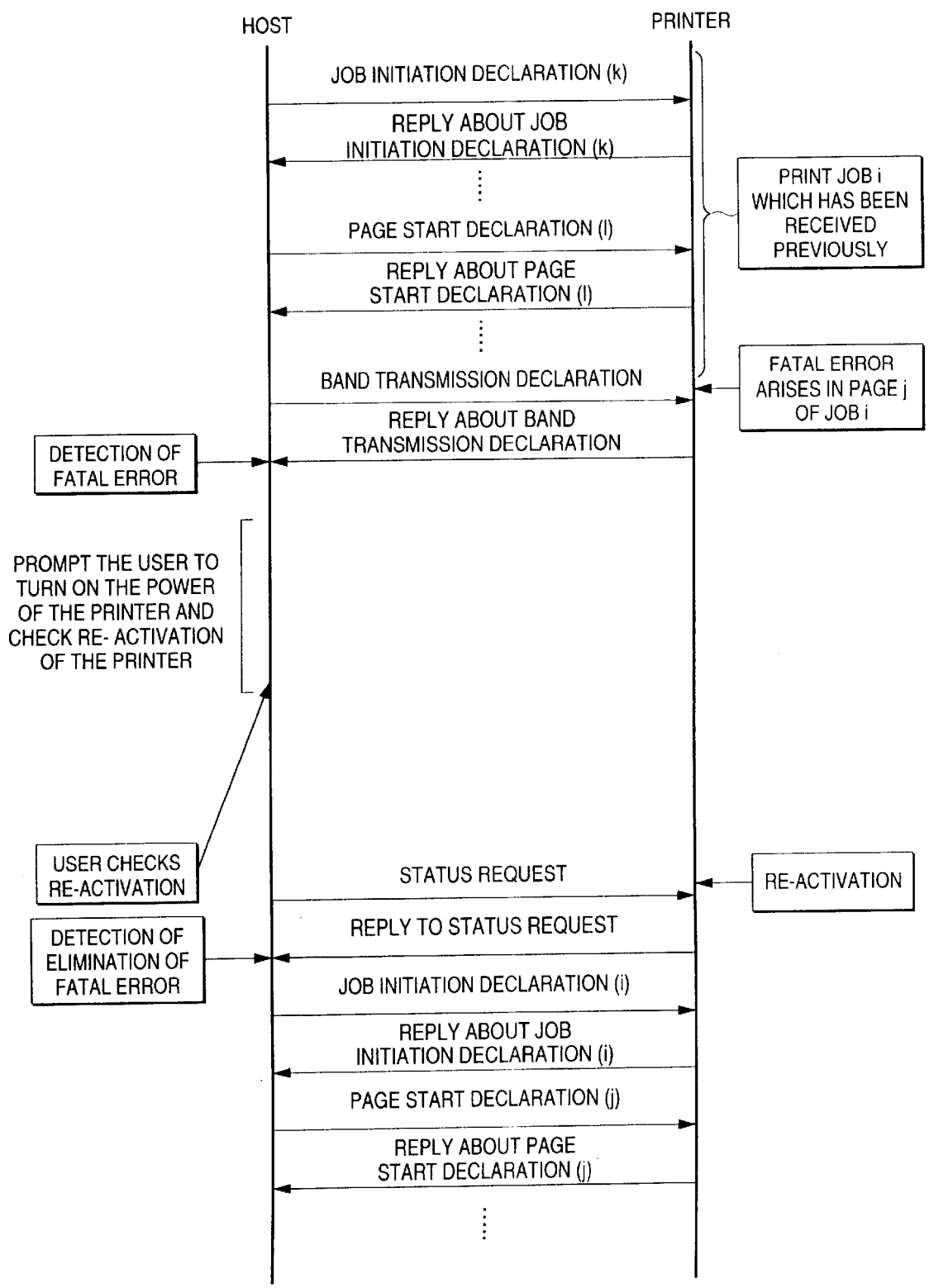
FIG. 16 is a diagram showing procedures for communication between the print monitor 9 (i.e., the host computer 1) and the printer 3 in the event of occurrence of a fatal error.

FIG. 15 shows the flow of error processing to be performed by the print monitor 9 in the event of occurrence of a fatal error. FIG. 16 shows procedures for the communication between the print monitor 9 (i.e., the host computer 1) and the printer 3 effected in the event of occurrence of a fatal error.

Upon detection of occurrence of a fatal error on the basis of the reply returned from the printer 3, the print monitor 9 shows, on the user interface screen, a message prompting the user to again turn on the power of the printer 2, as well as a re-activation acknowledgement button by which the user informs the print monitor 9 of re-activation of the printer 3 (S71). A check is made as to whether or not the user has pressed the re-activation acknowledgement button (S72). If the button has been pressed, the status request is transmitted to the printer 3 at regular time intervals (S73). On the basis of a reply responding to the request, a check is made as to whether or not the fatal error has been eliminated (S74). After elimination of the fatal error, the job initiation declaration is again transmitted to the printer 3 (S75). There is resumed re-transmission of the print data reserved in the host computer 1 as a new print job, in chronological sequence from the oldest page resource (i.e., from the page resource which was being printed at the time of occurrence of the error) (S76).

The preferred embodiment of the present invention has been described. This embodiment is illustrative for describing the present invention, and the present invention is not limited solely to the embodiment. The present invention can be implemented in various manners other than that described in connection with the previously-described embodiment.

What is claimed is:

1. A print system comprising:
   a printer; and
   a host device which is connected to said printer in a communicable manner and controls said printer, wherein
   (a) said printer comprises:
      memory used as a receiving buffer;
      receiving means which receives print data transmitted from said host device and stores the thus-received print data into the receiving buffer;
      print means which performs print operation based on the print data stored in the receiving buffer;
      status data means which determines the current status of or an error in said printer, prepares status data representing the thus-determined status or error, and retains the thus-prepared status data; and
      response means which, in response to an individual command sent from said host device, prepares a reply including the currently-retained status data and sends the reply back to said host device; and
   (b) said host device comprises:
      print data preparation means for preparing the print data;
      data transmission means which divide the thus-prepared print data pertaining to a single job into a plurality of fractional data sets, prepare a plurality of data transmission commands, each of which includes a corresponding one of the fractional data sets, and sequentially transmits the data transmission command to said printer;
      status acquisition means which receives a reply transmitted from said printer in response to each of the data transmission commands and acquires the status data included in the thus-received reply; and
      user interface means which informs a user of the status of or error in said printer, based on the thus-acquired status data.

2. A print system according to claim 1, wherein said host device further comprises status request means which transmits, to said printer, a status request command for requesting the status data when the data transmission command has not been transmitted.

3. A print system according to claim 1, wherein said printer further comprises means for notifying said host device of a memory capacity in response to an inquiry about the memory capacity transmitted from said host device; and said host device further comprises means which transmits the inquiry about the memory capacity to said printer before preparation of the print data pertaining to a single print job and which receives the memory capacity from said printer, wherein the print data preparation means of said host device prepares print data such that all image data included in the print data are expanded to a bit image and a plurality of transmission modes having different resolutions or levels of halftone are prepared with regard to the bit image, one transmission mode is selected from the plurality of transmission modes in accordance with the memory capacity reported by said printer, and the print data are prepared in accordance with the thus-selected transmission mode.

4. A print system according to claim 1, wherein the fractional data sets correspond to band data into which each page is divided on a per-band basis, and the print means of said printer initiates printing operation when said printer has received band data pertaining to a predetermined number of bands smaller than the number of bands corresponding to a single page of the beginning of print data pertaining to a single print job.

5. A print system according to claim 3, wherein the print means of the printer initiates printing operation when the receiving buffer becomes full before receipt of the band data pertaining to the predetermined number of bands.

6. A print system according to claim 2, wherein the reply returned from said printer includes buffer-full data representing whether or not the receiving buffer is full; and (1) when the buffer-full data included in the reply returned from said printer represents that the receiving buffer is full, the data transmission means temporarily suspends transmission of a subsequent data transmission command, the status request means repeatedly sends the status request command to said printer, and by reference to the reply returned in response to the status request command, said host device determines whether or not the receiving buffer has been released from a full state; and (2) when the receiving buffer has been released from the full state, the data transmission means resumes transmission of the subsequence data transmission command.

7. A print system according to claim 1, wherein the print data are divided into a single or a plurality of fractional data sets on a per-page basis, and said host device further comprises:

means for transmitting, before transmission of the data transmission command for a page, a page start declaration command including designation of the number of copies to be printed; and successful/unsuccessful multi-copy printing determination means which, in a case where a plurality of copies of a certain page are to be printed, determines whether or not all the data transmission commands pertaining to the page can be stored in the receiving buffer of the printer, that is, whether multi-copy printing of the page would be successful or unsuccessful; and wherein the data transmission means of said host device repeatedly transmits the entirety of the data transmission commands pertaining to the page for which the successful/unsuccessful multi-copy printing determination means has determined that the multi-copy printing would be unsuccessful, in the number of times corresponding to the number of copies to be printed; and with regard to a certain page which the page start declaration has designated to be printed in a plurality of copies, when the entirety of the data transmission commands corresponding to the page can be stored in the receiving buffer, the printer prints the page in the number of copies to be printed, based on the data transmission commands that correspond to the page and are stored in the receiving buffer.

8. A print system according to claim 1, wherein said printer comprises means for sending, to said host device, a page print completion report upon completion of printing of a page; said host device comprises management means for managing the print data on a per-page basis; and the management means retains the print data pertaining to the page that has already been transmitted to said printer, until receipt of a print completion report about the page.

9. A print system according to claim 8, wherein the management means has a queue representing the sequence of the pages which have been transmitted to said printer and discards print data pertaining to a head of the queue every time the management means receives a page print completion report.

10. A print system according to claim 1, wherein said host device further comprises error processing means which determines a type of the error when the status data included in the reply represent an occurrence of the error, and which executes an error processing routine corresponding to the thus-determined type of the error.

11. A product set for use in configuring a print system comprising:

a printer; and a computer-readable recording medium on which there is recorded a program for activating a computer as a host device for controlling said printer, wherein (a) said printer comprises:

memory used as a receiving buffer;

receiving means which receives print data transmitted from said host device and stores the thus-received print data into the receiving buffer;

print means which performs print operation based on the print data stored in the receiving buffer;

status data means which determines the current status of or an error in said printer, prepares status data representing the thus-determined status or error, and retains the thus-prepared status data; and response means which, in response to an individual command sent from said host device, prepares a reply including the currently-retained status data and sends the reply back to said host device; and (b) said host device comprises:

print data preparation means for preparing the print data;

data transmission means which divide the thus-prepared print data pertaining to a single job into a plurality of fractional data sets, prepare a plurality of data transmission commands, each of which includes a corresponding one of the fractional data sets, and sequentially transmits the data transmission command to said printer;

status acquisition means which, in response to each of the data transmission commands, receives a reply transmitted from said printer and acquires the status data included in the thus-received reply; and user interface means which informs a user of the status of or error in said printer, based on the thus-acquired status data.

12. A host device for controlling the printer, wherein the printer comprises:

memory used as a receiving buffer;

receiving means which receives print data transmitted from the host device and stores the thus-received print data into the receiving buffer;

print means which performs print operation based on the print data stored in the receiving buffer;

status data means which determines the current status of or an error in the printer, prepares status data representing the thus-determined status or error, and retains the thus-prepared status data; and response means which, in response to an individual command sent from said host device, prepares a reply including the currently-retained status data and sends the reply back to said host device, wherein said host device comprises:
 print data preparation means for preparing the print data;
 data transmission means which divide the thus-prepared print data pertaining to a single job into a plurality of fractional data sets, prepare a plurality of data transmission commands, each of which includes a corresponding one of the fractional data sets, and sequentially transmits the data transmission command to the printer;
 status acquisition means which receives a reply transmitted from the printer in response to each of the data transmission commands and acquires the status data included in the thus-received reply; and
 user interface means which informs a user of the status of or error in the printer, based on the thus-acquired status data.

13. A method of activating a host device for controlling a printer, wherein the printer includes:

memory used as a receiving buffer, receiving means which receives print data transmitted from the host device and stores the thus-received print data into the receiving buffer, print means which performs print operation on the basis of the print data stored in the receiving buffer, status data means which determines the current status of or an error in the printer, prepares status data representing the thus-determined status or error, and retains the thus-prepared status data, and response means which prepares a reply including the currently-retained status data in response to an individual command sent from the host device and which sends back the reply to the host device, wherein said activating method comprises:
 a print data preparation step for preparing the print data;
 a data transmission step of dividing the thus-prepared print data pertaining to a single job into a plurality of fractional data sets, preparing a plurality of data transmission commands, each of which includes each of the fractional data sets, and sequentially transmitting the data transmission command to the printer;
 a status acquisition step of receiving a replay transmitted from the printer in response to each of the data transmission commands and acquiring the status data included in the thus-received reply; and
 a user interface step of informing a user of the status of or error in the printer, based on the thus-acquired status data.

14. A computer-readable recording medium on which there is recorded a program of a method for activating a computer as a host device for controlling a printer, wherein the printer includes:

memory used as a receiving buffer;

receiving means which receives print data transmitted from the host device and stores the thus-received print data into the receiving buffer;

print means which performs,print operation on the basis of the print data stored in the receiving buffer;

status data means which determines the current status of or an error in the printer, prepares status data representing the thus-determined status or error, and retains the thus-prepared status data; and response means which, in response to an individual command sent from the host device, prepares a reply including the currently-retained status data and sends the reply back to the host device; and wherein said activating method comprises:
 a print data preparation step for preparing the print data;
 a data transmission step of dividing the thus-prepared print data pertaining to a single job into a plurality of fractional data sets, preparing a plurality of data transmission commands, each of which includes a corresponding one of the fractional data sets, and sequentially transmitting the data transmission command to the printer;
 a status acquisition step of receiving a reply transmitted from the printer in response to each of the data transmission commands and acquiring the status data included in the thus-received reply; and
 a user interface step of informing a user of the status of or error in the printer, on the basis of the thus-acquired status data.

15. A print system comprising:

a printer; and a host device which is connected to said printer in a communicable manner and controls said printer, wherein
 (a) said printer comprises:
  print means which receives print data transmitted from said host device;
  status data means which determines a current status of or an error in said printer, prepares status data representing the thus-determined status or error, and retains the thus-prepared status data; and
  status report means which informs said host device of the currently-retained status data in response to a status request transmitted from said host device; and
 (b) said host device comprises:
  status request means for sending the status request to said printer, whenever necessary;
  data transmission means for transmitting the print data to said printer; and control means which, based on the status data reported by said printer in response to the status request, checks whether a problem has arisen in said printer and, in the event a problem has arisen, suspends or aborts transmission of the print data.

16. A computer-readable recording medium on which there is recorded a program for activating a computer as a host device, the host device being connected to a printer in a communicable manner and controlling the printer, wherein the printer comprises:

print means which receives print data transmitted from the host device;

status data means which determines the current status of or an error in the printer, prepares status data representing the thus-determined status or error, and retains the thus-prepared status data; and status report means which, in response to a status request transmitted from the host device, informs the host device of the currently-retained status data; and the host device comprises:

status request means for sending the status request to the printer, whenever necessary;

data transmission means for transmitting the print data to the printer; and control means which, based on the status data reported by the printer in response to the status request, checks whether a problem has arisen in the printer and, in the event a problem has arisen, suspends or aborts transmission of the print data.

17. A print system comprising:

a printer; and a host device connected to said printer in a communicable manner, wherein (a) said printer comprises:

status data device operable to determine a current status of said printer, prepare status data representing the thus-determined status; and response device operable to prepare a reply including the status data and send the reply to said host device; and wherein further, (b) said host device comprises:

data transmission device operable to divide the print data into a plurality of fractional data sets, prepare a plurality of data transmission commands, each of which includes a corresponding one of the fractional data sets, and transmit the data transmission commands to said printer; and status request device operable to transmit a status request command requesting the status data when the data transmission command has not been transmitted.

18. A print system comprising:

a printer; and a host device which is connected to said printer in a communicable manner, wherein (a) said printer comprises:

status data device operable to determine a current status of said printer, prepares status data representing the thus-determined status;

response device operable to prepare a reply including the status data and send the reply to said host device; and sending device operable to send, to said host device, a page print completion report upon completion of printing of a page; and wherein further, (b) said host device comprises:

data transmission device operable to divide the print data into a plurality of fractional data sets, prepare a plurality of data transmission commands, each of which includes a corresponding one of the fractional data sets, and transmit the data transmission commands to said printer; and management means for managing the print data on a per-page basis, and the management means retains the print data pertaining to the page that has already been transmitted to said printer, until receipt of a print completion report has been received by said host.

19. A print system comprising:

a printer; and a host device connected to said printer in a communicable manner, wherein (a) said printer comprises:

status data device operable to determine a current status of said printer, prepare status data representing the thus-determined status; and response device operable to prepare a reply including the status data and send the reply to said host device; and wherein further, (b) said host device comprises:

data transmission device operable to divide the print data into a plurality of fractional data sets, prepare a plurality of data transmission commands, each of which includes a corresponding one of the transmit the data transmission commands to said printer; and error processing device operable to determine a type of error when the status data included in the reply represent an occurrence of an error, and execute an error processing routine corresponding to the thus-determined type of error.

* * * * *